United States Patent [11] 3,593,598

[72] Inventors William C. Winn
Inkster;
Stanley D. Rosen, Farmington, both of, Mich.
[21] Appl. No. 850,692
[22] Filed Aug. 5, 1969
[45] Patented July 20, 1971
[73] Assignee Ford Motor Company
Dearborn, Mich.
Continuation-in-part of application Ser. No. 747,340, July 24, 1968, now abandoned.

[54] AUTOMATIC POWER TRANSMISSION CONTROLS
6 Claims, 4 Drawing Figs.
[52] U.S. Cl. ................................................ 74/864, 74/869
[51] Int. Cl. ...................................................B60k 21/08
[50] Field of Search........................................... 74/868, 869, 863—865, 867—869

[56] References Cited
UNITED STATES PATENTS
| | | | |
|---|---|---|---|
| 2,932,977 | 4/1960 | Ball .............................. | 74/868 |
| 3,393,585 | 7/1968 | Pierce, Jr...................... | 74/869 X |
| 3,401,581 | 9/1968 | Chana .......................... | 74/868 X |
| 3,446,098 | 5/1969 | Searles ......................... | 74/869 |

Primary Examiner—Arthur T. McKeon
Attorneys—John R. Faulkner and Donald J. Harrington ABSTRACT: This specification discloses a control valve system for a geared, automatic, power transmission mechanism, including fluid pressure operated clutches and brakes for establishing various speed ratios. During operation in the lowest speed ratio, the gearing torque reaction is accommodated by a friction brake that acts as the reaction point also during reverse drive. A servo pressure modulator establishes the optimum servo pressure during forward drive acceleration in the lowest speed ratio. Provision is made for overruling the pressure modulating action of the modulator during reverse drive, thereby causing an increase in the servo operating pressure to accommodate the increased reaction torque requirement during reverse drive.

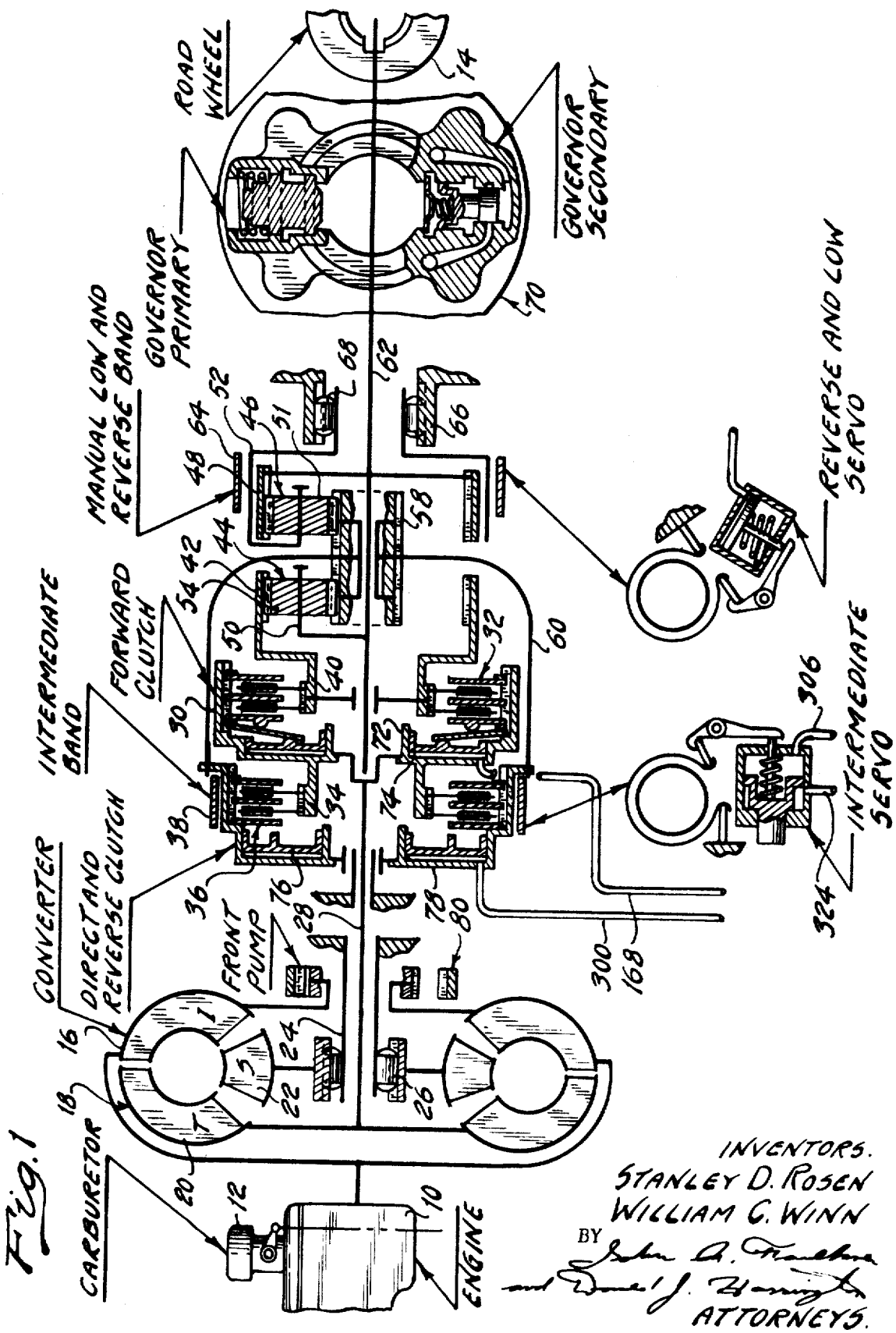

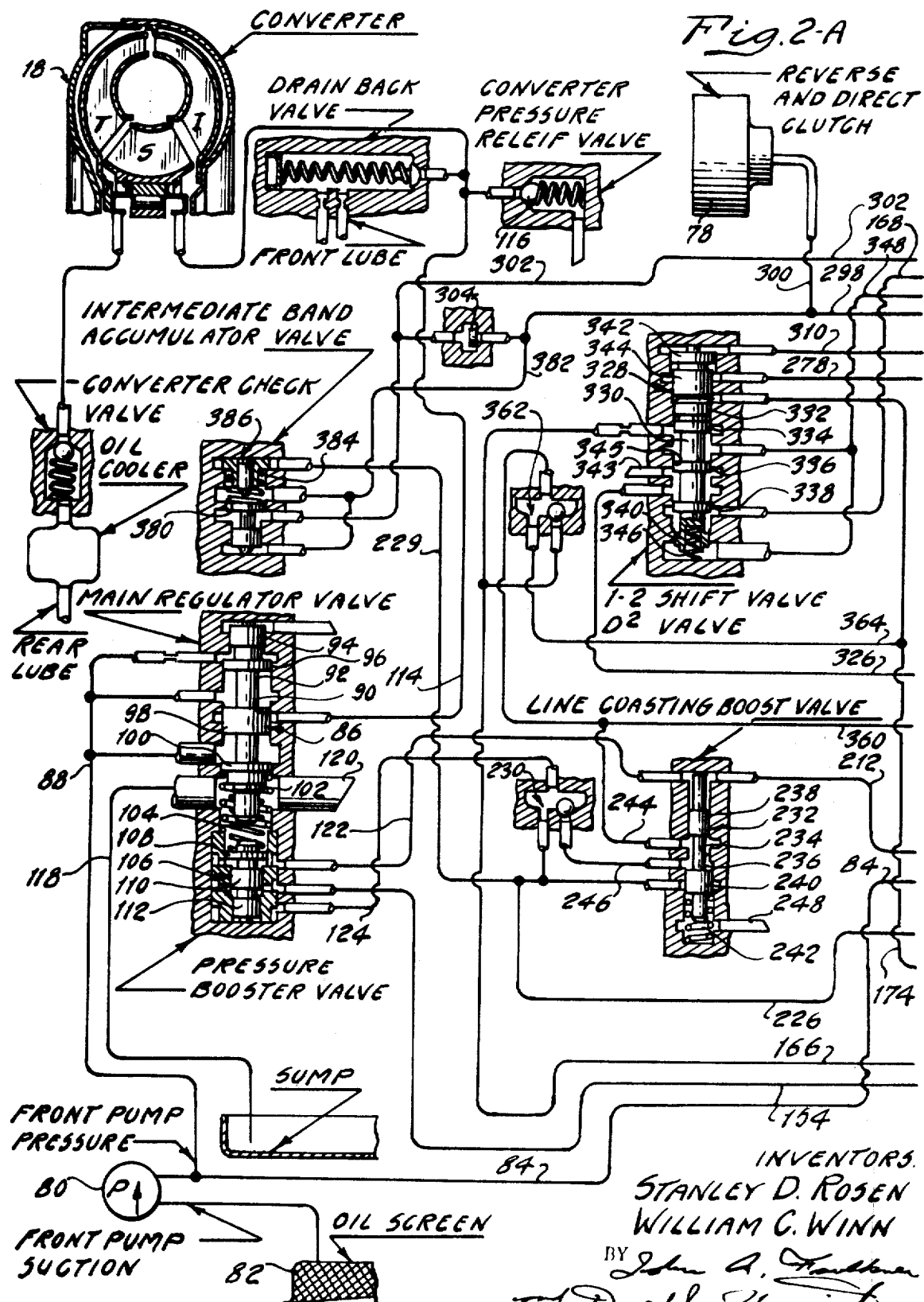
Fig. 2-A

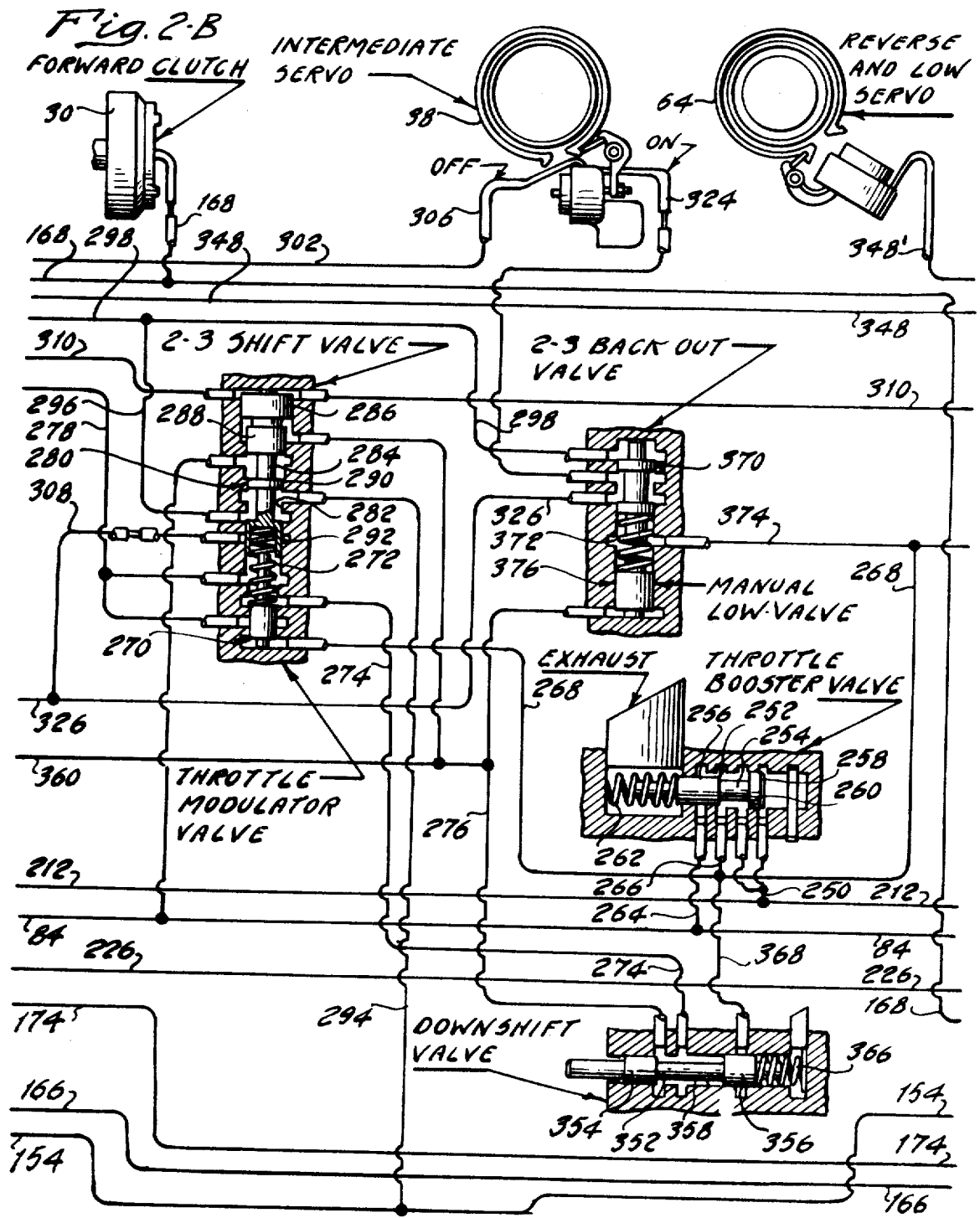

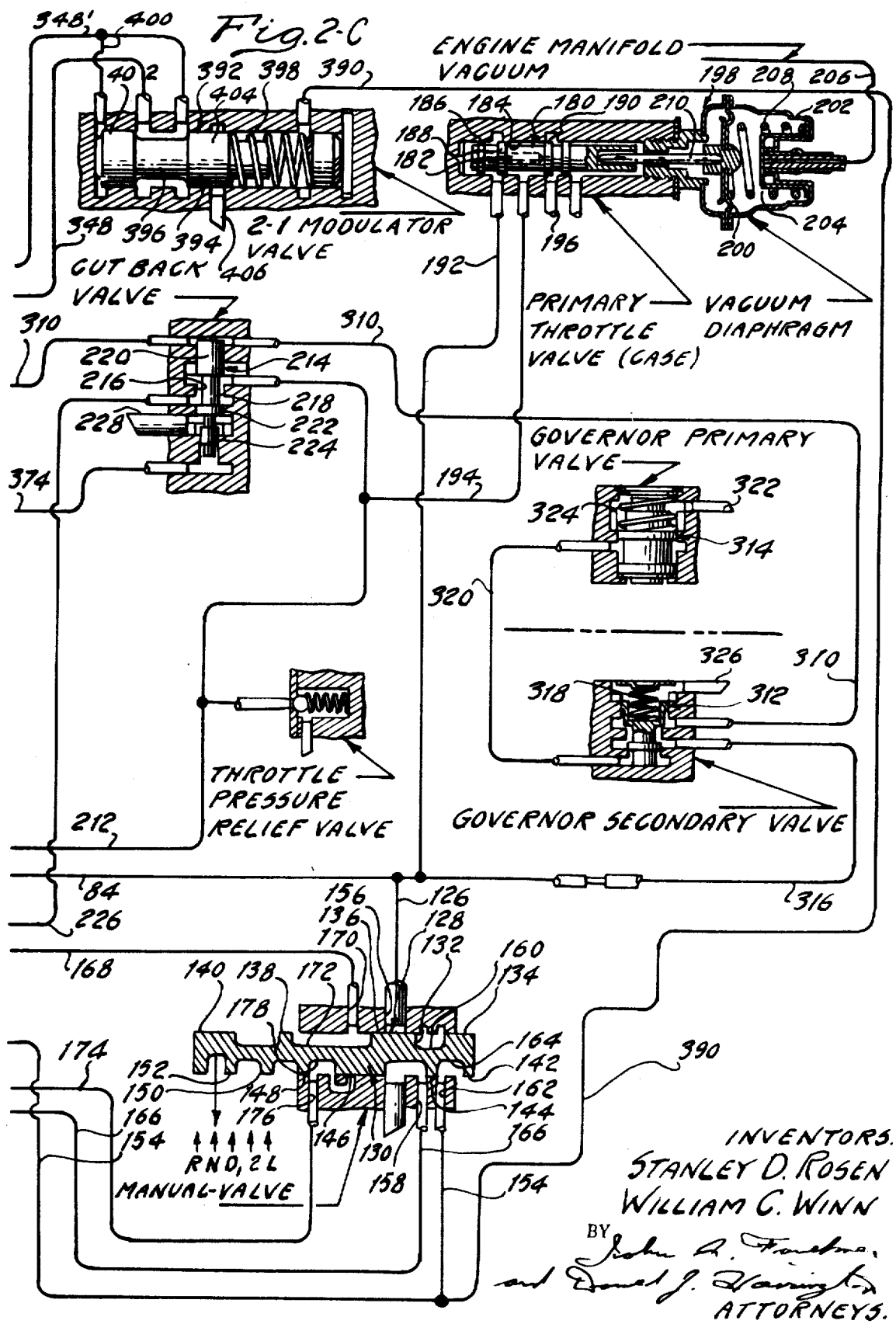

AUTOMATIC POWER TRANSMISSION CONTROLS

The instant application is a continuation-in-part of application Ser. No. 747,340, now abandoned, filed July 24, 1968.

GENERAL DESCRIPTION OF THE INVENTION

This invention comprises a control system for an automatic power transmission mechanism having fluid pressure operated clutch and brake servos for controlling the relative motion of gear elements that establish multiple torque delivery paths from a driving member to a driven member. The transmission includes a common brake servo for accommodating torque reaction during low speed ratio, forward-drive operation and during reverse-drive operation. During forward-drive operation, the torque requirements of the servo are reduced relative to the torque requirements during reverse-drive. The servo in prior art systems of this kind must be calibrated to accommodate the most severe torque delivery conditions. This means that the brake servo is subjected to an excessive pressure during forward-drive, low speed ratio operation when the torque delivery requirements are reduced. This introduces a relatively harsh ratio shift when the transmission mechanism is shifted from neutral to low speed ratio or is downshifted from an intermediate underdrive ratio to the low speed ratio.

Our improved valve system eliminates this harsh brake engagement as the transmission mechanism is conditioned for forward-drive, low speed-ratio operation by modulating the servo pressure that is made available to the low speed ratio servo to produce an effective servo pressure that is adequate to maintain torque capacity, but which does not exceed the pressure necessary to maintain brake engagement. Provision is made, however, for overruling the modulating action of the modulator valve when the transmission is conditioned for reverse drive. In this way the effective servo pressure for reverse drive can be increased to that value that is required to accommodate reverse driving torque without at the same time upsetting the calibration of the brake servo for the improved shift quality during ratio changes from a higher speed-ratio to the low speed ratio or from neutral to low.

BRIEF DESCRIPTION OF THE FIGURES OF THE DRAWING

FIG. 1 is a schematic representation of the transmission gearing arrangement capable of being used with the improved control system of my invention.

FIGS. 2A, 2B and 2C show a schematic diagram of the valve circuit for controlling the clutch and brake servos of the transmission structure of FIG. 1.

PARTICULAR DESCRIPTION OF THE INVENTION

In FIG. 1 numeral 10 designates generally an automotive vehicle, internal combustion engine. It is provided with an air-fuel mixture carburetor 12 which supplies the combustion cylinders of the engine with a combustible mixture through an intake manifold system. The pressure in this manifold system is used as an operating variable for the transmission valve system that I will describe.

The vehicle includes road wheels 14 which are connected to the power output shaft of the transmission system through a suitable drive shaft and differential axle assembly.

The engine crankshaft is connected to the impeller 16 of a hydrokinetic torque converter 18. The impeller 16 is situated in toroidal fluid flow relationship with respect to a bladed turbine 20. A bladed stator 22 is located between the turbine flow exit and the impeller flow entrance in the usual fashion.

A stationary stator sleeve shaft 24, which is connected to the relatively stationary transmission housing, supports the stator 22. An overrunning brake 26 anchors the stator 22 to the stator shaft 24 and inhibits rotation of the stator in one direction although it accommodates freewheeling motion in the opposite direction.

The turbine 20 is connected directly to turbine shaft 28. A clutch drum 30 is connected directly to the turbine shaft 28. This drum forms a part of a multiple disc clutch assembly 32 which is engaged during forward-drive operation in each of the forward-drive speed ratios. It is identified in FIG. 1 as a forward clutch.

Drum 30 carries clutch element 34 which forms a part of a multiple disc clutch assembly 36. A friction brake band 38 surrounds an outer drum portion of the clutch 36. It is identified in FIG. 1 as the intermediate band. It is applied and released by an intermediate servo which comprises a cylinder within which is positioned a movable piston that is drivably connected to the operating end of the band 38. The piston and the cylinder cooperate to define a pair of opposed fluid pressure chambers. When both chambers are applied, the brake band is released. When the right-hand pressure chamber is exhausted and the left-hand pressure chamber is pressurized, the brake band is applied.

Forward clutch 32 includes a clutch element 40 which is connected directly to ring gear 42 of a simple planetary gear unit 44. A companion simple planetary gear unit 46 comprises a ring gear 48 and a carrier 52. This corresponds to carrier 50 of the planetary gear unit 44. Carrier 50 journals rotatably a plurality of planet pinions 54 and carrier 52 carries rotatably a plurality of planet pinions 51. Gear units 44 and 46 share a common sun gear 58.

Carrier 52 defines a brake drum about which is positioned a brake band 64. This band is applied and released by a reverse-and-low servo. The band is identified in FIG. 1 as the manual low-and-reverse band.

The reverse-and-low servo comprises a cylinder and a piston which cooperate to define a pressure chamber. As the chamber is pressurized, the brake band is applied. A piston release spring disengages the brake band as fluid pressure is exhausted from the servo.

The sun gear 58 is drivably coupled to the clutch drum for the direct-and-reverse clutch 36 be means of a drive shell 60. This shell surrounds the gear unit 44 and the multiple disc clutch assembly 32.

Carrier 50 is connected directly to the power output shaft 62. Carrier 52 is adapted to be anchored to the relatively stationary housing of the transmission mechanism by an overrunning clutch shown in part at 66. The clutch comprises an outer race connected directly to the transmission housing, and an inner race connected to the carrier 52. Overrunning brake rollers 68 are situated between the races. One of the races is cammed to permit a camming action with the roller 68, thereby inhibiting rotation of the carrier 52 in one direction but permitting freewheeling motion in the opposite direction.

Brake 66 complements the action of the brake 64. The latter can be applied during manual low range operation and during reverse-drive. When the operator desires an automatic ratio change from a low speed ratio to the intermediate speed ratio, however, overrunning brake 66 provides the sole means for accommodating torque reaction. The brake band 64 is released.

The governor valve assembly 70 is connected directly to the shaft 62. It comprises a primary governor and a secondary governor, as will be explained subsequently with reference to FIG. 2C. This governor assembly provides a speed sensitive pressure signal that is utilized by the automatic control valve circuit.

The forward clutch is applied by a clutch servo comprising a clutch cylinder 72 in which is positioned a clutch piston 74. The cylinder and piston, which cooperate to define a pressure cavity, applies and releases the friction discs of the forward clutch. A cylinder 78 within which is positioned a piston 76, comprises a servo for the direct-and-reverse clutch. Fluid pressure can be applied to the clutch servos through feed passages, as will be explained subsequently with reference to FIG. 2.

The front pump for supplying circuit pressure for the control valve circuit of FIGS. 2a, 2b and 2c is driven by the impeller, as indicated schematically in FIG. 1.

To condition the mechanism for operation in the low speed range, brake band 64 is applied. Multiple disc clutch assembly 32 is applied as it is during operation in any of the forward-drive speed ranges. Turbine torque, which is developed by the torque converter 18, is transferred through the turbine shaft 28 and through the engaged clutch 32 to the ring gear 42. The resistance to movement of the carrier 50 offered by the output shaft 62 causes the sun gear 58 to rotate in a backward direction relative to engine rotation. This causes ring gear 48 to rotate in the direction of rotation of the engine as the carrier 52 is anchored by the brake 64. Ring gear 48 delivers its torque directly to the shaft 62. Thus a split torque delivery path is provided, with a portion of the torque being delivered to each of the three gear units.

If continued operation in the low speed ratio is not desired, the torque reaction of the carrier 52 can be accommodated by the overrunning brake 66 rather than the brake band 64. This is the case whenever the transmission is conditioned for automatic ratio changes in the forward drive range.

To initiate a change in the speed ratio from the low speed ratio to the intermediate speed ratio, brake band 38 is applied. If brake band 64 was used during low speed ratio operation, it is released. The forward clutch 32 remains applied. Thus the sun gear 58 now becomes a reaction member as turbine torque is delivered to the ring gear 42. Torque multiplication occurs through the gear unit 44, and gear unit 46 has no function at this time.

To condition the mechanism for operation in the high speed ratio range, brake band 38 is released and clutch 36 is applied. Clutch 32, as mentioned earlier, remains applied. All the brakes are released. The clutches thus connect together the elements of the gearing for rotation in unison with a 1:1 drive ratio.

Reverse drive is achieved by disengaging the forward clutch 32 and engaging the direct-and-reverse clutch 36. At the same time the brake band 64 is applied and the brake band 38 is released. Turbine torque then is delivered from the shaft 28 and through the clutch 36 to the sun gear 58. Carrier 52 acts as a reaction member as the ring gear 48 is driven backward by the ring gears 58. The reverse motion of the ring gear 48 is imparted to the output shaft 62.

In FIGS. 2A, 2B and 2C I have shown schematically the control valve circuit for controlling the engagement and release of the clutches and brakes of the FIG. 1 construction. The impeller driven front pump is identified in FIG. 2 by reference character 80. It receives fluid from a transmission sump in which is situated an oil screen 82 located in the lower region of the transmission housing. The pump delivers pressure to pump discharge passage 84 which serves as a main pressure feed passage.

A main regulator valve 86 regulates the pressure level of the pressure in the passage 84. It communicates with the passage 84 through passage 88.

The valve 86 comprises a valve chamber 90 which receives a multiple land valve spool 92. This spool, which comprises spaced valve lands 94, 96, 98, and 100, is biased in an upward direction as viewed in FIG. 2A by a pair of valve springs 102 and 104. Spring 104 is seated on a pressure booster valve 106 which has three spaced valve lands 108, 110 and 112.

When pressure begins to develop in passage 84, it is received by the chamber 90 between lands 98 and 96. At the same time a pressure buildup occurs on the differential area defined by lands 94 and 96. After a predetermined pressure is achieved, communication is established between passage 88 and the converter feed passage 114. This supplies the torque converter 18 with charge pressure. The maximum pressure in the converter is maintained at a safe value by the presence of a converter pressure relief valve 116 which communicates with the passage 114.

The valve chamber 90 communicates also with a sump passage 118. Passage 114 is uncovered first upon a pressure buildup in the passage 84, thereby providing priority for the converter before the exhaust port 120 is uncovered by land 100. The passage 118 communicates with the port 120. Communication between passages 88 and 114 is controlled by land 98. In the absence of throttle pressure acting on the pressure booster valve 106, the regulated line pressure maintained by the valve 86 is determined by the calibration of the springs 104 and 102.

A pressure signal is distributed through the differential area defined by the lands 108 and 110 of the pressure booster valve through a passage 122. This signal, which is proportional in magnitude to the engine manifold pressure, is developed by a primary throttle valve assembly which will be described subsequently with reference to FIG. 2C. An auxiliary pressure is distributed to the differential area defined by lands 112 and 110 on the pressure booster valve. This signal is distributed through passage 124. It is either present or absent, and it is effective when it is present to augment the cutback in the pressure signal due to the presence of a signal pressure in passage 122.

Pressure is supplied from the passage 124 by a cutback valve that will be described subsequently with reference to FIG. 2C. The cutback valve responds to governor pressure to supply the passage 124 with primary throttle valve pressure or to exhaust the same. In this way a higher circuit pressure is made available during stall and during initial acceleration from a standing start when higher torque capacities are required by the friction torque establishing devices.

Control pressure passage 84 communicates with a passage 126 which extends directly to the driver-operated manual valve 128. This valve comprises a multiple valve element 130 slidably situated in a valve chamber 132. The valve chamber is formed with lands which register with multiple valve lands 134, 136, 138 and 140 located at one side of the valve element 130. It is formed with other internal valve lands that register selectively with lands 142, 144, 146, 148, 150 and 152 located on the opposite side of the valve element 130.

The various operating positions of the valve element 130 are determined by the symbols R, N, D1, 2 and L. These, respectively, correspond to the reverse range position, the neutral position, the automatic forward-drive operating range position, the intermediate speed ratio range position and the low speed ratio range position. When the valve element 130 assumes the "R" position, passage 154 becomes pressurized as it is brought into communication with passage 126. At that time passage 126 communicates with valve port 156 which is brought into communication with valve port 158 through valve space 160 located between lands 132 and 134. Communication between port 158 and port 162 is established at that time by valve space 164 located between lands 142 and 144. Passage 154 communicates with port 162. Passage 166 also is pressurized since it communicates with pressurized port 158.

Passage 168, which communicates with the valve opening 132 through valve port 170, is exhausted at that time through the exhaust opening on the left-hand end of the valve chamber 132 and through the communicating valve space 172 situated between the valve lands 138 and 136. Passage 174, which communicates with valve port 176 in the chamber 132, is exhausted through the left-hand end of the chamber 132 and through the communicating valve space 178 located between lands 148 and 146. Passage 174 is pressurized whenever the valve element 130 is shifted to the "2" position. Passage 168 is pressurized whenever the valve element 130 is in the "D1", the "2" or the "L" positions. Passage 154 is pressurized only when the valve element 130 is moved to the "R" position and passage 166 is pressurized only when the valve element 130 is moved to the "L" or "R" positions.

A pressure signal that is related functionally in magnitude to engine intake manifold pressure is obtained by a primary throttle valve indicated generally by reference character 180. This valve comprises a valve spool 182 situated within the valve chamber 184. The spool 182 is formed with spaced valve lands 186, 188 and 190. These lands register with cooperating internal lands in the valve chamber 184.

A control pressure passage 192 extends to the valve chamber 184 from the control pressure passage 84.

An engine manifold pressure sensitive signal, hereinafter referred to as throttle valve pressure or throttle pressure, is distributed from the valve 180 through passage 194. It communicates with the chamber 184 at a location between lands 188 and 190. The chamber 180 is provided with an exhaust port as shown at 196.

A vacuum diaphragm assembly 198 actuates the valve element 182. A flexible diaphragm 200 and a diaphragm housing 202, which comprise part of the vacuum diaphragm assembly 198, define a manifold pressure chamber 204 which communicates with the engine manifold through an engine manifold pressure passage 206. The diaphragm is urged in a left-hand direction by valve spring 208. The result of the forces due to the spring 208 and the engine manifold pressure in the chamber 204 is transmitted to the valve element 182 through a valve operating rod 210.

The manifold pressure sensitive signal in passage 194 is distributed through passage 212 to the pressure boosting valve. This pressure signal acts on the differential area of lands 110 and 108.

Passage 194 communicates also with cutback valve 214. This valve comprises a valve chamber 216 and a multiple land valve element 218. Element 218 is formed with spaced valve lands 220, 222 and 224 which register with internal valve lands in the chamber 216.

When the valve element 218 is positioned, as shown in FIG. 2C, the space between lands 220 and 222 establishes communication between passage 212 and cutback pressure passage 226. When the valve element 218 moves in a downward direction, as viewed in FIG. 2C, communication is established between passage 226 and the exhaust port 228. At the same time land 220 blocks passage 212.

Cutback pressure passage 226 communicates with accumulator valve passage 229. The cutback pressure passage 124 associated with the pressure booster valve of FIG. 2A communicates with passage 229 through a two-way ball check valve assembly 230. Passage 229, which is pressurized by passage 226 when the cutback valve 214 assumes the position shown in FIG. 2C, communicates with the line coasting boost valve 232. This valve comprises a valve chamber 234 within which is positioned a valve element 236 having spaced valve lands 238 and 240. Valve element 236 is biased in an upward direction, as viewed in FIG. 2A, by a valve spring 242. The upper end of land 238 communicates with the primary throttle valve pressure passage 212, the pressure force established by the primary throttle valve pressure in that passage opposing the force of the spring 242. The diameter of land 240 is bigger than the diameter of land 236.

Passage 244 is pressurized whenever the manual valve is moved to the "2" position or the "L" position. It is exhausted in other driving modes. It communicates with the chamber 234 at a location intermediate lands 238 and 240. Passage 229 is exhausted through passage 226 and through the cutback valve whenever the cutback valve assumes a downward position, as viewed in FIG. 2C. Thus during operation in the "2" or "L" ranges with the vehicle traveling at a speed in excess of that speed at which the cutback valve shifts in a downward direction, the line coasting boost valve 232 will produce a regulated pressure in passage 246 which is distributed to the cutback pressure passage 124 through the check valve assembly 230. At this time, of course, the ball in the check ball assembly 230 seals the exhaust flow path through the passage 226.

The chamber occupied by the spring 242 is exhausted through an exhaust port 248. The primary throttle valve pressure in passage 194 communicates with passage 250, which extends to the throttle booster valve 252. This valve comprises a valve spool 254 which has formed thereon valve lands of differential diameter as indicated at 256 and 258. Valve element 254 is slidably situated in the valve chamber 260 having internal valve lands that register with the lands 256 and 258. Valve spring 262 urges the valve element 254 in a right-hand direction.

Control pressure is distributed to the valve chamber 260 through control pressure passage 264, which is connected to the main control pressure feed passage 84. Primary throttle valve pressure in passage 250 is distributed to the right-hand end of the valve element 254 and also to the valve chamber 260 at a location intermediate the lands 256 and 258. Output pressure passage 266 communicates with the valve chamber 260 also at a location between the lands 256 and 258.

When the magnitude of the pressure in passage 250 is less than a predetermined value, as determined by the calibration of the spring 262, direct communication is established between passage 250 and passage 266. As the pressure in passage 250 increases beyond a calibrated minimum value, valve element 254 tends to shift in a left-hand direction against the opposing force of spring 262. This causes an increase in the degree of communication between passage 264 and output pressure passage 266 while at the same time communication between output pressure passage 266 and primary throttle valve pressure passage 250 is decreased. This results in an augmentation of the magnitude in the output pressure signal in the passage 266. This augmented signal, hereinafter referred to as secondary throttle valve pressure, is distributed to the lower end of the cutback valve through passages 268 and 374. The presence of secondary throttle valve pressure in passage 268 delays the point at which the cutback valve shifts during acceleration from a standing start. It is intended that this delay will cause the cutback valve to shift after an automatic 1—2 upshift occurs during the acceleration period but before the automatic 2—3 upshift occurs. In this way the pressure booster valve remains active for a longer period of time and a higher circuit pressure is maintained to provide an increased torque capacity in the servos when it is needed during the early stages of the acceleration period even beyond the 1—2 upshift point.

Secondary throttle valve pressure in passage 268 is distributed also to the lower end of throttle modulator valve 270. This valve is a single diameter valve element which is received within a throttle valve chamber having internal lands that register with the single land of the valve element 270. Valve 270 is urged in a downward direction by valve spring 272.

Passage 274 is exhausted when the manual valve assumes any position other than the "2" position or the "L" position. It serves as an exhaust flow path for the throttle modulator valve. Passage 274 is exhausted through the downshift valve subsequently to be described and through passage 276, which communicates with the passage 274 through the downshift valve.

Valve 270 modulates the pressure in passage 268 to produce a modulated, reduced throttle pressure in passage 278.

A 2—3 shift valve 280 is situated in a valve bore 282 that is aligned with the valve 270. Shift valve 280 comprises a movable valve element 284 having spaced valve lands 286, 288, 290 and 292. Passage 154, which is pressurized whenever the manual valve assumes the reverse position, communicates with passage 294 which in turn communicates with the valve chamber 282 at a location intermediate lands 290 and 292. The pressure during the reverse-drive operation then can be distributed through the 2—3 shift valve from passage 294 to communicating passage 296 which extends to passage 298. The direct-and-reverse clutch 36 receives control pressure from passage 298 through feed passage 300. The same pressure is distributed from passage 298 to passage 302 through one-way check valve 304. Passage 302 in turn communicates directly with the intermediate servo release pressure chamber through feed passage 306. The transmission is conditioned for reverse-drive operation when the manual valve is shifted to the "R" position, at which time the 2— 3 shift valve and the 1—2 shift valve, subsequently to be described, are in their respective downshift positions as indicated in FIGS. 2A and 2B.

The pressure feed passage for the 2—3 shift valve 280 is identified by reference character 308. Passage 308 receives its pressure from the 1—2 shift valve, as will be explained subsequently. Thus whenever the 1—2 shift valve is in the downshift position, passage 308 is exhausted thereby preventing distribution of pressure to the 2—3 shift valve. The 2—3 shift valve then is inoperative even though it may move in response to pressure signals from the throttle booster valve and from the governor valve, which now will be described.

The upper end of land 286 communicates with the governor pressure passage 310, which extends to a secondary governor valve 312. This governor valve, together with the primary governor valve 314, is carried by a common governor valve body, the entire assembly being identified in FIG. 1 by reference character 70. The assembly 70 is connected drivably to the power output shaft 62 so that the centrifugal force actuates the governor valves 312 and 314.

Control pressure is distributed to the secondary governor valve 312 through a governor feed passage 316. Valve 312 comprises a valve element with lands of differential area. The valve element is urged in a radially outward direction by a valve spring 318. The force of the spring 318 balances the pressure force acting on the valve element. The valve element modulates the pressure in passage 316 to produce a governor pressure signal in output pressure passage 310.

The radially outward end of the secondary governor valve element communicates with the primary governor valve chamber through a crossover passage 320. The primary governor valve 314 includes a radially movable valve element which blocks the passage 320 when it assumes a radially inward position. When it assumes a radially outward position, however, communication is established between passage 320 and exhaust port 322. The valve element for the primary governor valve 314 is urged radially inwardly by a valve spring 324.

When the speed of rotation of the output shaft is sufficiently high, the force of spring 324 is overcome by the centrifugal force due to the mass of the valve element for the primary governor valve 314. This will permit the secondary governor valve to modulate the pressure in passage 316. At other speeds the pressure buildup that occurs in passage 320 renders the secondary governor valve 312 inactive, and the passage 310 is in communication with exhaust port 326 of the secondary governor valve 312.

The pressure signal in passage 310 thus is an indicator of vehicle speed at any speed in excess of the speed at which the primary governor valve 324 moves radially outwardly. This speed signal is distributed through passage 310 to the upper end of the valve land 286 to urge the 2—3 shift valve normally to an upshift position against the opposing influence of the secondary throttle valve pressure.

The pressure in passage 310 acts also on the other end of the cutback valve so that the cutback valve will respond to an increase in road speed to reduce the magnitude of the circuit pressure made available to the servos after a 1—2 upshift occurs.

When the 2—3 shift valve element 284 assumes the position shown, communication is established between passage 296 and the exhaust region through exhausted passage 294. As mentioned earlier, this passage is exhausted whenever the manual valve assumes any position other than the reverse position. This causes the reverse-and-direct clutch and the release side of the intermediate servo to become exhausted. When the 2—3 shift valve moves to the upshift position, land 290 blocks communication between passages 294 and 296. At the same time communication is established between passage 296 and feed passage 308. This allows pressure distribution to the reverse-and-direct clutch and to the release side of the intermediate servo. The apply side of the intermediate servo is pressurized through passage 324 at that time. This passage communicates with control pressure passage 326 through the 2—3 backout valve, which will be described subsequently. Passage 326 in turn communicates with the feed passage 308. When both sides of the intermediate servo are pressurized, the servo assumes a release position. When the release side of the intermediate servo is exhausted, the servo is applied.

The feed passage for the 2—3 shift valve, as shown at 308, communicates with passage 326 which extends to the 1—2 shift valve identified generally be reference character 328. This includes a valve element 330 having spaced valve lands 332, 334, 336, 338 and 340. A separate valve element, which forms a part of the 1—2 shift valve assembly, is located on the upper end of the valve element 330. It comprises a pair of valve lands 342 and 344 of differential area. It is adapted to engage valve element 330, but it is not connected directly to it. The lands of valve 330 register with internal valve lands formed in the valve chamber 342 for the 1—2 shift valve assembly.

When the valve element 330 assumes the downshift position shown in FIG. 2A, communication is established between passage 326 and exhaust port 343. Modulated secondary throttle pressure is distributed to a differential area defined by lands 342 and 344. This supplements the force of valve spring 346 to maintain the valve assembly in a downshift position. The force of the spring 346 and the modulated secondary throttle pressure force is opposed by the force of the governor pressure in passage 310, which acts on the upper end of land 342.

When the valve element 330 assumes an upshift position, communication is established between passage 326 and control pressure passage 168, which is pressurized, as mentioned earlier, whenever the manual valve is shifted to the "D1", "2" or the "L" positions. Communication between passage 326 and exhaust port 343 is interrupted and communication between passage 348 and the exhaust port 343 is established. Passage 348 extends to the low-and-reverse servo.

When the valve element 330 assumes the downshift position shown in FIG. 2A, communication is established between passage 166 and passage 348, thereby causing the low-and-reverse servo to become applied. This occurs, however, only when the manual valve is moved to the "L" or the "R" positions since only at that time is the passage 166 pressurized. It is exhausted at other times.

When an upshift occurs for the valve element 330, the differential area defined by lands 340 and 338 becomes exhausted through the exhausted passage 348. This introduces a so-called snap action that eliminates hunting of valve element 330 between the upshift and the downshift positions.

The diameter of land 332 is slightly greater than the diameter of land 334. When the valve element 330 is in the upshift position, the differential area defined by these lands is subjected to a pressure force due to the existence of pressure in passage 166 when the manual valve element is shifted to the "L" or "R" positions. At other times this passage 166 is exhausted. When the vehicle is operating at a relatively high road speed and the manual valve is shifted to the "L" position, the existence of the pressure on the differential area of lands 332 and 334 establishes a proper shift point as the vehicle speed is reduced to a value that will make it possible for an automatic downshift from the intermediate speed ratio to the low speed ratio.

A change in engine throttle position under these conditions will cause a change in circuit pressure for the reason previously described. That is, the pressure booster valve normally would tend to decrease the circuit pressure because it is sensitive to changes in manifold pressure as the engine carburetor throttle setting changes. But in order to maintain a relatively constant 2—1 downshift point regardless of changes in the engine throttle setting, it is necessary to modify the pressure acting on the 1—2 shift valve and D2 valve assembly. This is done by means of the downshift valve 350.

The downshift valve comprises an adjustable valve element 352 having a pair of spaced valve lands 354 and 356. The diameter of land 356 is greater than the diameter of land 354. Element 352 is situated in the valve chamber 358. Passage 276 communicates with the valve chamber at a location intermediate the lands 354 and 356. This passage communicates also with a passage 360 which is pressurized with the pressure in passage 166. This is because of the fact that passage 166 communicates with passage 360 through the two-way check valve assembly 362. The check valve assembly seals passage 364 under these conditions. Passage 364 communicates with passage 174, which is exhausted at all times except when the manual valve assumes the "2" position.

Valve element 352 is urged in a left-hand direction, as viewed in FIG. 2B, by a valve spring 366. Primary throttle valve pressure is distributed to valve chamber 358 through passage 368. Passage 360, which is exhausted when the manual valve assumes any position other than the "L" or "R" positions, is in communication with passage 274 through the downshift valve chamber 358. As mentioned earlier, however, passage 166, passage 276 and passage 360 are pressurized with line pressure when the manual valve assumes the "L" or "R" positions. This will cause the downshift valve to regulate the pressure in passage 276 to produce a resultant modified pressure in passage 274. This modified pressure is transferred to the differential area of lands 342 and 344, thereby establishing the proper 2—1 downshift point.

The downshift valve 350 is connected mechanically to the engine carburetor throttle. When the engine carburetor throttle is moved to a fully wide-open position, the valve element 352 is shifted mechanically in a right-hand position, thereby connecting passage 368 with passage 274. At that time the magnitude of the pressure in passage 368 is substantially equal to control pressure. Thus both shift valves are urged toward a downshift position, thereby tending to overrule the automatic shifting tendencies. The downshifting forces, however, are not sufficient to move the shift valves to their respective downshift positions at speeds greater than precalibrated road speeds.

The intermediate servo apply chamber can be engaged through passage 324 with 2—3 backout valve 370. This valve is similar to the one described in U.S. Pat. No. 3,295,387 and will not be described in particular here. It is effective to cushion the application of the high speed ratio clutch when the transmission shifts from the intermediate speed ratio to the high speed ratio during coasting or minimum engine throttle operation. It does this by providing controlled communication between the direct drive clutch and the apply side of the intermediate servo when the 2—3 shift valve moves to the upshift position. The valve moves at that time in a downward direction against the opposing force of valve spring 372 as the pressure buildup occurs on the upper end of the valve. This pressure is distributed to the valve through passage 298 which is equal to the direct clutch pressure at any given instant during the shift interval. The 2—3 backout valve is sensitive also to secondary throttle valve pressure so that the degree of accumulation or cushioning action provided by it is dependent upon the magnitude of the secondary throttle valve pressure. The lower end of the 2—3 backout valve communicates with secondary throttle valve pressure passage 266 through the crossover passage 374.

The function of the 2—3 backout valve is overruled by the manual low valve 376, which normally is in the inactive position shown in FIG. 2C. When the manual valve is shifted to the "L" position, however, passage 276, which communicates with the lower end of the manual low valve, is pressurized thereby shifting the 2—3 backout valve and the manual low valve in unison to the upward position.

Passage 174 communicates directly with the 1—2 shift valve assembly at a location intermediate the land 344 and 332. Thus whenever the manual valve is shifted to the "2" position, the 1—2 shift valve is forced to the upshift position. Passage 168, which is pressurized during operation in all forward ranges, then is brought into communication with passage 326 which causes the apply side of the intermediate servo to become pressurized. In this way the operator can select the intermediate speed ratio, and the transmission will remain in that ratio until the operator moves the manual valve from the "2" position to some other position. The operation of the 2—3 shift valve is overruled when the 1—2 shift valve is downshifted since the 1—2 shift valve will then interrupt distribution of control pressure to passage 308. Selection of second speed ratio then can be made by the 2—3 shift valve rather than by the manual valve. It is possible, therefore, for the operator to be assured of a proper manual ratio change to the intermediate ratio without pressure distribution to the high speed ratio clutch regardless of whether the manual valve is shifted to a position intermediate the "$D_1$" range position and the "2" position. If leakage should occur across the manual valve lands when the manual valve is positioned inadvertently between the "$D_1$" and "2" positions, the pressure that is thus bypassed will not be routed to the high speed ratio clutch.

When the manual valve is shifted to the "L" position, passage 166 becomes pressurized as mentioned earlier. The 1—2 shift valve under these conditions establishes communication between passages 166 and 348. The same control pressure is admitted to passage 348 and to the lower end of the 1—2 shift valve to maintain it in the position shown in FIG. 2A. Thus the low speed servo becomes applied and operation in that ratio will continue until the operator again moves the manual valve to some position other than the "L" position.

When the operator shifts the manual valve to the "D1" position, passage 166 is exhausted. The 1—2 shift valve is exhausted. The 1—2 shift valve is free to move to the upshift position when the road speed is sufficient to cause this to occur automatically. Thus the operator can control the drive range in which he chooses to operate. He can either shift to the "D1" position and make the transmission conditioned for automatic upshifts and downshifts in the usual fashion, or he can select either continuous operation in the intermediate speed ratio range or continuous operation in the low speed ratio range.

The intermediate band accumulator valve 380 is situated between the passage 302, which extends to the intermediate servo release chamber, and the passage 382 which is exhausted through the exhausted passage 294 and through the 2—3 shift valve. The accumulator valve is provided with a differential area on which the accumulator pressure on the release side of the intermediate servo is allowed to act. This buildup in pressure during accumulation in the intermediate servo creates a force on the accumulator valve element that is opposed by valve spring 384.

The force of the spring 384 is supplemented by a pressure force acting on a valve plunger 386 situated in the upper end of the valve assembly 380. The valve plunger 386 is subjected to the cutback pressure in passage 229.

Since cutback pressure exists in passage 229 until the instant that the cutback valve is shifted, as explained previously, the cutback occurs after the 1—2 upshift. Accumulating action of the accumulator valve 380 is augmented during automatic 1—2 upshifts as well as 3—2 downshifts. The magnitude of the augmentation depends, of course, upon the magnitude of the primary throttle valve pressure made available to passage 229. When the throttle valve pressure is high, it is not necessary for the intermediate servo accumulator to develop a higher pressure on the release side of the servo before the accumulator piston begins to stroke to the "off" position.

When the vehicle is coasting with the manual valve in the "L" position, control pressure is made available to passage 244. This is due to the fact that passage 166 is brought into communication with passage 244 through the 3–2 check valve 362 at that time. Similarly, control pressure is made available to passage 244 whenever the manual valve assumes the "2" position. This is due to the fact that communication is established at that time between passage 174 and passage 244 through the two-way check valve 362. Due to the differential area of lands 238 and 240 on the line coasting boost valve, the valve element 236 will be caused to modulate thus producing a regulated pressure in passage 124 during coasting with the manual valve in either the "L" position or the "2" position. This regulated pressure, as explained previously, augments the circuit pressure to maintain clutch and brake capacity during coasting.

If there is a complete absence of primary throttle valve pressure acting on the upper end of the valve element 236, the spring 242 will maintain a constant regulated line pressure of a minimum value, which in one operating embodiment is 81 p.s.i. It is desirable, however, to maintain a constant 2-1 downshift point when the manual valve is shifted to the "L" position as coasting continues, regardless of changes in primary throttle valve pressure. This is accomplished by allowing the primary throttle valve pressure to influence the calibration of the line coasting boost valve.

The result of an increase in primary throttle valve pressure during coasting is an opposition to the influence of the valve spring 242. This reduces the response of the regulator valve to changes in primary throttle valve pressure. This occurs in spite of the presence of the pressure boost due to the existence of pressure in passage 122 and the force produced by that pressure on the differential area of lands 108 and 110.

Passage 390 extends from passage 154 to 2-1 modulator valve 392. This includes a valve chamber 394 within which is situated a double land valve spool 396. Spool 396 normally is urged in a left-hand direction by valve spring 398.

Reverse-and-low servo feed passage 348 communicates with passage 348' extending to the reverse-and-low servo through the valve chamber 394. The pressure on the downstream side of the modulator valve 392 is distributed to a feedback passage 400, which communicates with the left-hand side of the valve spool 396. Spool 396 includes two valve lands 402 and 404 which may be of equal diameter. Valve land 402 registers with passage 348 as it controls the degree of communication between passage 348 and passage 348'. Valve land 404 controls the degree of communication between passage 348' and exhaust port 406.

Passage 390 communicates with the right-hand end of the valve chamber 394 and the region of the spring 398. Normally the 2-1 modulator valve 392 will modulate the pressure in passage 348 for the reverse-and-low servo. The 2-1 modulator valve reduces the pressure made available to the low-and-reverse servo by the 1-2 shift modulator when the transmission is in the forward-drive operating mode, thereby providing the optimum servo pressure that will maintain shift quality during a 2-1 shift or during shift from the neutral position of the manual valve to the "I" position. When the reverse drive is selected by the manual valve, however, passage 390 is pressurized. It is pressurized only when the manual valve is shifted to the 37 R" position. The pressure thus distributed to the right-hand end of the valve spool 396 will shift the same in a left-hand direction to an inoperative position, thereby establishing direct communication between passage 348 and 348' with no modulating action taking place. This increases the servo capacity to accommodate the increased torque reaction during the reverse drive.

Having thus described a preferred form of my invention, what we claim and desire to secure by U.S. Letters Patent is:

1. A multiple ratio power transmission mechanism adapted to deliver driving torque from a driving member to a driven member, gear elements forming plural torque delivery paths between said driving member and said driven member, clutches and brakes selectively engageable to establish and disestablish at least one underdrive ratio and a reverse-drive ratio, fluid pressure operated servos adapted to actuate said clutches and brakes, a fluid pressure source, a friction brake actuated by one of said servos for establishing a torque reaction point during reverse-drive operation and operation in said underdrive ratio, conduit structure interconnecting said servo and said pressure source, a fluid pressure distributor valve means in said conduit structure for controlling distribution of pressure from said source to said servos to establish various speed ratios, multiple-position manual valve means between said distributor valve means and said pressure source for supplying from said pressure source control pressure for said distributor valve means, a modulator valve means in fluid communication with said one servo for modifying the effective pressure made available to said one servo thereby establishing an optimum servo pressure for a smooth ratio shift to said underdrive ratio, and a fluid connection between said manual valve means and said modulator valve means for supplying a pressure signal distributed from the former to the latter thereby producing a force on the latter which overrules its influence on the pressure in said one servo during reverse-drive operation thereby establishing a higher effective servo pressure during reverse drive.

2. The combination as set forth in claim 1 wherein said modulator valve means is hydraulically connected to said manual valve means through a control signal passage, said control signal passage communicating with said pressure source through said manual valve means when said manual valve means assumes a reverse-drive position, said control signal passage communicating with the exhaust region through said manual valve means when said manual valve means assumes a forward driving position.

3. The combination as set forth in claim 1 wherein said modulator valve means comprises a valve spool, a valve chamber within which said spool is received, a spring urging normally said valve spool in one direction, said spool having two valve lands, the conduit structure for said servo communicating with said valve chamber at a location intermediate said valve lands, an exhaust port communicating with said said valve chamber, a feedback passage communicating with one side of said valve chamber and with said servo whereby said valve chamber and with said servo whereby said valve spool modulates the pressure made available to said servo thereby establishing a controlled servo pressure of optimum value to assure a quality ratio shift into said underdrive ratio.

4. The combination as set forth in claim 2 wherein said modulator valve means comprises a valve spool, a valve chamber within which said spool is received, a spring urging normally said valve spool in one direction, said spool having two valve lands, the conduit structure for said servo communicating with said valve chamber at a location intermediate said valve lands, an exhaust port communicating with said valve chamber, a feedback passage communicating with one side of said valve chamber and with said servo whereby said valve spool modulates the pressure made available to said servo thereby establishing a controlled servo pressure of optimum value to assure a quality ratio shift into said underdrive ratio.

5. The combination as set forth in claim 3 wherein said control signal passage extends from said manual valve to said modulator valve means and communicates with said valve chamber in the region of said valve spring thereby establishing a pressure force during reverse-drive operation that overrules the modulating action of said modulator valve means.

6. The combination as set forth in claim 4 wherein said control signal passage extends from said manual valve to said modulator valve means and communicates with said valve chamber in the region of said valve spring thereby establishing a pressure force during reverse-drive operation that overrules the modulating action of said modulator valve means.